United States Patent
Goparaju et al.

(10) Patent No.: US 10,370,540 B2
(45) Date of Patent: Aug. 6, 2019

(54) INORGANIC PIGMENTS SURFACE TREATED WITH POLYOL ESTERS

(71) Applicant: Tronox LLC, Oklahoma City, OK (US)

(72) Inventors: Venkata Rama Rao Goparaju, Edmond, OK (US); Vahid Kazerooni, Yukon, OK (US)

(73) Assignee: Tronox LLC, Oklahoma City, OK (US)

( * ) Notice: Subject to any disclaimer, the term of this patent is extended or adjusted under 35 U.S.C. 154(b) by 252 days.

(21) Appl. No.: 14/851,634

(22) Filed: Sep. 11, 2015

(65) Prior Publication Data

US 2017/0073523 A1    Mar. 16, 2017

(51) Int. Cl.
| | | |
|---|---|---|
| *C09C 3/08* | (2006.01) | |
| *C09C 1/36* | (2006.01) | |
| *C09C 3/12* | (2006.01) | |
| *C08K 9/04* | (2006.01) | |
| *C08K 9/08* | (2006.01) | |
| *C08K 3/22* | (2006.01) | |

(52) U.S. Cl.
CPC .................. *C09C 3/08* (2013.01); *C08K 9/04* (2013.01); *C08K 9/08* (2013.01); *C09C 1/3669* (2013.01); *C09C 3/12* (2013.01); *C08K 2003/2241* (2013.01)

(58) Field of Classification Search
CPC ........... C09C 3/08; C09C 1/3669; C09C 3/12; C08K 9/10
USPC ...................................................... 524/315
See application file for complete search history.

(56) References Cited

U.S. PATENT DOCUMENTS

| | | |
|---|---|---|
| 3,172,772 A | 3/1965 | Rowe |
| 3,728,142 A | 4/1973 | Rudolph et al. |
| 3,754,956 A | 8/1973 | Durrant et al. |
| 3,825,438 A | 7/1974 | Pritchard |
| 3,925,095 A | 12/1975 | Bockmann et al. |
| 3,947,287 A | 3/1976 | Belde et al. |
| 4,061,503 A | 12/1977 | Berger et al. |
| 4,127,421 A | 11/1978 | Ferrill, Jr. |
| 4,151,154 A | 4/1979 | Berger |
| 4,183,843 A | 1/1980 | Koenig et al. |
| 4,209,430 A | 6/1980 | Weber |
| 4,357,170 A | 11/1982 | Brand |
| 4,375,520 A | 3/1983 | Pennie et al. |
| 4,375,989 A | 3/1983 | Makinen |
| 4,377,417 A | 3/1983 | Brand |
| 4,563,221 A | 1/1986 | Humphreys |
| 4,599,114 A | 7/1986 | Atkinson |
| 4,640,943 A | 2/1987 | Meguro et al. |
| 4,762,523 A | 8/1988 | Gawol et al. |
| 4,810,305 A | 3/1989 | Braun et al. |
| 4,909,853 A | 3/1990 | Wienkenhover et al. |
| 4,935,063 A | 6/1990 | Costanzi et al. |
| 4,986,853 A | 1/1991 | Kieser |
| 5,260,353 A | 11/1993 | Palmer et al. |
| 5,288,320 A | 2/1994 | Decelles |
| 5,318,625 A | 6/1994 | Stramel |
| 5,362,770 A | 11/1994 | Palmer et al. |
| 5,397,391 A | 3/1995 | Stramel |
| 5,567,754 A | 10/1996 | Stramel |
| 5,607,994 A | 3/1997 | Tooley et al. |
| 5,631,310 A | 5/1997 | Tooley et al. |
| 5,643,592 A | 7/1997 | Jacobson et al. |
| 5,733,365 A | 3/1998 | Halko et al. |
| 5,830,929 A | 11/1998 | Stramel |
| 5,837,049 A | 11/1998 | Watson et al. |
| 5,889,090 A | 3/1999 | Tooley et al. |
| 5,908,498 A | 6/1999 | Kauffman et al. |
| 5,910,213 A | 6/1999 | Ashdown et al. |
| 5,959,004 A | 9/1999 | Tooley et al. |
| 6,528,068 B1 | 3/2003 | Yumoika et al. |
| 6,544,328 B2 | 4/2003 | Roberts et al. |
| 6,646,037 B1 | 11/2003 | Ei-Shoubary et al. |
| 6,713,543 B2 | 3/2004 | Ei-Shoubary et al. |
| 6,825,251 B2 | 11/2004 | Ei-Shoubary et al. |
| 6,946,028 B1* | 9/2005 | Craig ............... C09C 1/3669 106/417 |
| 6,958,091 B1* | 10/2005 | Craig ............... C09C 1/3661 106/417 |
| 7,138,011 B2* | 11/2006 | Craig ............... C09C 1/3661 106/499 |
| 8,394,873 B2 | 3/2013 | Kostelnik et al. |
| 2002/0055562 A1 | 5/2002 | Butuc |
| 2003/0029359 A1 | 2/2003 | Marshall et al. |
| 2006/0042511 A1* | 3/2006 | Craig ............... C09C 1/3607 106/447 |

(Continued)

FOREIGN PATENT DOCUMENTS

| | | |
|---|---|---|
| CN | 103601889 A | 2/2014 |
| JP | 4235049 | 12/2008 |

OTHER PUBLICATIONS

Wikipedia definition of Polyolester, https://en.wikipedia.org/wiki/Polyolester, downloaded Sep. 10, 2015.

Schaefer, T.G., Esters in Synthetic Lubricants, http://www.bobistheoilguy.com/esters-in-synthetic-lubricants/, downloaded Sep. 10, 2015.

International Search Report and Written Opinion in corresponding international application PCT/US16/45178, dated Oct. 20, 2016, Tronox LLC.

(Continued)

*Primary Examiner* — Jane L Stanley

(74) *Attorney, Agent, or Firm* — McAfee & Taft

(57) ABSTRACT

A treated, particulate inorganic pigment is provided. The treated, particulate inorganic pigment comprises a plurality of pigment particles, and a polyol ester deposited on the surfaces of the pigment particles. A method of forming a treated, particulate inorganic pigment and a polymer composition are also provided.

27 Claims, No Drawings

(56) References Cited

U.S. PATENT DOCUMENTS

| | | | |
|---|---|---|---|
| 2006/0042512 A1* | 3/2006 | Craig | C09C 1/3623 |
| | | | 106/447 |
| 2006/0047020 A1* | 3/2006 | Craig | C08K 9/04 |
| | | | 523/200 |
| 2006/0047022 A1* | 3/2006 | Craig | C08K 9/04 |
| | | | 523/210 |
| 2006/0048674 A1* | 3/2006 | Craig | C09C 1/021 |
| | | | 106/35 |
| 2007/0185261 A1 | 8/2007 | Lee et al. | |
| 2008/0048677 A1* | 2/2008 | Tan | G01R 35/005 |
| | | | 324/638 |
| 2014/0275442 A1 | 9/2014 | Goparaju et al. | |
| 2014/0348765 A1 | 11/2014 | Sasaki | |
| 2015/0232669 A1 | 8/2015 | Daute et al. | |
| 2015/0265510 A1* | 9/2015 | Johncock | C09C 1/3661 |
| | | | 424/401 |

OTHER PUBLICATIONS

Office Action dated Jun. 22, 2017 in corresponding Taiwan application No. 105121639, Tronox LLC.

Examination Report No. 1, dated Aug. 9, 2018 in corresponding Australian Patent Application 2016320611, Tronox LLC.

* cited by examiner

INORGANIC PIGMENTS SURFACE TREATED WITH POLYOL ESTERS

BACKGROUND

Inorganic pigments are used as opacifiers and colorants in various applications including coating (for example, ink and paint), plastic and paper applications. The effectiveness of inorganic pigments in such applications depends in part on how evenly the pigment can be dispersed in the respective base composition (for example, a polymer composition).

In order to facilitate even distribution of inorganic pigments into base compositions, the pigments are typically formed into finely divided powders. For example, the particle size of a pigment can be reduced by milling or micronizing the pigment during the finishing steps of the pigment manufacturing process.

Unfortunately, pigment powders tend to be dusty and exhibit poor flow characteristics. These issues can make the pigment powders difficult to bag and transport and create problems in forming, compounding and manufacturing end-use products. The poor flow characteristics of the pigment particles can make the amount of time and energy needed to sufficiently disperse the particles into base compositions excessively high. Dispersion of pigment powders into polymer compositions can be particularly problematic.

Increasing the ability of inorganic pigments to be dispersed into base compositions makes the pigments more suitable for end use applications.

DETAILED DESCRIPTION

The present disclosure may be understood more readily by reference to this detailed description as well as to the examples included herein. Numerous specific details are set forth in order to provide a thorough understanding of the examples described herein. However, it will be understood by those of ordinary skill in the art that the examples described herein can be practiced without these specific details. In other instances, methods, procedures and components have not been described in detail in order to avoid obscuring the related relevant feature being described. Also, the description is not to be considered as limiting the scope of the examples.

In accordance with this disclosure, a treated, particulate inorganic pigment, and a method of forming a treated, particulate inorganic pigment are provided. In another aspect, this disclosure includes a polymer composition that includes a treated, particulate inorganic pigment.

The treated, particulate inorganic pigment disclosed herein comprises a plurality of pigment particles, and a polyol ester deposited on the surfaces of the pigment particles. As used herein and in the appended claims, "deposited" on the surfaces of the pigment particles means deposited directly or indirectly on the surfaces of the pigment particles unless stated otherwise.

For example, the pigment particles of the treated, particulate inorganic oxide pigment disclosed herein can be formed of a pigment selected from the group consisting of titanium dioxide, basic carbonate white lead, basic sulfate white lead, basic silicate white lead, zinc sulfide, composite pigments of zinc sulfide and barium sulfate, zinc oxide, antimony oxide, iron oxide, lead oxide, aluminum oxide, silicon dioxide, chromium oxide, zirconium oxide, calcium carbonate, calcium sulfate, china clay, kaolin clay, mica, diatomaceous earth, cadmium sulfide, cadmium selenide, lead chromate, zinc chromate, nickel titanate, and mixtures thereof. For example, the pigment particles can be formed of titanium dioxide. For example, the titanium dioxide can have a rutile crystalline structure or a combination of an anatase crystalline structure and a rutile crystalline structure. For example, the titanium dioxide can have a rutile crystalline structure. For example, the titanium dioxide can be formed by the sulfate or the chloride process. For example, the titanium dioxide can be formed by the chloride process.

In the sulfate process for manufacturing the titanium dioxide, for example, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

In the chloride process for manufacturing the titanium dioxide, for example, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. Aluminum chloride or some other co-oxidant is typically added to the titanium halide in the oxidation reactor to facilitate rutile formation and control particle size. The titanium dioxide and gaseous reaction products are then cooled and the titanium dioxide particles are recovered.

The pigment particles of the treated inorganic oxide disclosed herein can be treated with various components as known in the art. For example, at least one inorganic coating can be deposited on the surfaces of the pigment particles. For example, at least one inorganic coating selected from the group consisting of metal oxide coatings, metal hydroxide coatings, and mixtures thereof can be deposited on the surfaces of the pigment particles. For example, at least one inorganic coating selected from the group consisting of silica coatings, alumina coatings, and mixtures thereof can be deposited on the surfaces of the pigment particles. The inorganic coating(s) can be used to impart one or more properties and/or characteristics to the pigment particles to make the pigment particles more suitable for specific end uses. For example, silica and/or alumina coatings can be used to help improve the wetting and dispersing properties of the pigment particles.

As used herein and in the appended claims, a "polyol ester" means an ester that is formed with a polyhydric alcohol that includes two or more hydroxyl groups. For example, the polyol ester deposited on the surfaces of the pigment particles can be formed by reacting at least one fatty acid with a polyhydric alcohol. The fatty acid(s) partially or fully esterifies the polyhydric alcohol to form a polyol ester.

For example, the fatty acid(s) used to form the polyol ester can be a monobasic or dibasic, linear or branched, saturated or unsaturated fatty acid. For example, the fatty acid(s) can be a saturated, straight chain fatty acid. For example, the fatty acid(s) can be a saturated, branched chain fatty acid. For example, the fatty acid(s) can be a dimer acid. For example, the fatty acid(s) can have from 6 to 24 carbon atoms. For example, the fatty acid(s) can have from 8 to 20 carbon atoms. By way of further example, the fatty acid(s) can have from 8 to 16 carbon atoms.

For example, the fatty acid(s) used to form the polyol ester can selected from the group consisting of trimethyl hexanoic acid, octanoic acid, decanoic acid, dodecanoic acid, myristic acid, oleic acid, stearic acid, caprylic acid, capric acid, lauric acid, palmitic acid, arachic acid, behenic acid, adipic acid, sebacic acid, azelaic acid, and mixtures thereof. For example, the fatty acid(s) can be selected from the group consisting of oleic acid, stearic acid, caprylic acid, capric acid, lauric acid, and mixtures thereof.

As another example, the fatty acid(s) used to form the polyol ester can be a fatty acid that has been reacted with a silicone compound to form a silicone modified fatty acid or a fatty acid modified silicone. As used herein and in the appended claims, "silicone modified fatty acid" and "fatty acid modified silicone" mean the same thing and may be used interchangeably. For example, fatty acid modified silicones suitable for use herein can have the following formula:

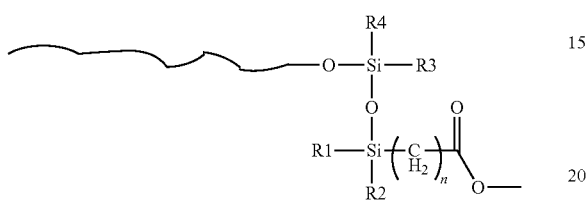

wherein R1, R2, R3 and R4 are each selected from a hydrogen moiety, a methyl (CH$_3$) group and a higher alkyl group, and wherein R1, R2, R3 and R4 can be the same or different.

For example, the polyhydric alcohol used to form the polyol ester can have a saturated or unsaturated, straight or branched alkyl chain with at least two hydroxyl groups attached thereto. For example, the polyhydric alcohol can have a saturated or unsaturated branched alkyl chain with two or more hydroxyl groups attached thereto. For example, the polyhydric alcohol can be selected from the group consisting of ethylene glycol, glycerol, neopentyl glycol, trimethylolpropane, pentaerythritol, mannitol, sorbitol, and mixtures thereof. For example, the polyhydric alcohol can be selected from the group consisting of trimethylolpropane, pentaerythritol, mannitol, and mixtures thereof. For example, the polyhydric alcohol can be trimethylolpropane.

For example, in one embodiment, the polyol ester is formed by reacting at least one fatty acid selected from the group consisting of oleic acid, stearic acid, caprylic acid, capric acid, lauric acid, a fatty acid modified silicone, and mixtures thereof with a polyhydric alcohol selected from the group consisting of trimethylolpropane, pentaerythritol, mannitol, and mixtures thereof. For example, in another embodiment, the polyol ester is a trimethylolpropane based polyester formed by reacting at least one fatty acid selected from the group consisting of oleic acid, stearic acid, caprylic acid, capric acid, lauric acid, a fatty acid modified silicone, and mixtures thereof with trimethylolpropane.

For example, the polyol ester suitable for treating the inorganic pigment in accordance with this disclosure can be a neopentyl glycol ester (a "NPG ester") (that is formed with a polyhydric alcohol that includes two hydroxyl groups), a trimethylolpropane ester (a "TMP ester") (that is formed with a polyhydric alcohol that includes three hydroxyl groups), a pentaerythritol ester (a "PE ester") (that is formed with a polyhydric alcohol that includes four hydroxyl groups) or a dipentaerythritol ester (a "DiPE ester") (that is formed with a polyhydric alcohol that includes six hydroxyl groups). For example, the polyol ester suitable for treating the inorganic pigment in accordance with this disclosure can be a polyol triester.

For example, the polyol ester suitable for use herein can have the formula RCOOR1 wherein R1 is a short chain polyol having less than 10 carbon atoms. For example, R1 can be a short chain polyol having less than 7 carbon atoms. For example, R1 can be a short chain polyol having 6 or 7 carbon atoms. For example, the polyol esters suitable for use herein can be selected from the group consisting of trimethylolpropane trilaurate, trimethylolpropane tricocoate, trimethylol propane tristearate, and mixtures thereof.

Examples of specific polyol esters that can be used are shown below:

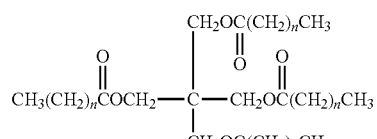

Pentaerythritol ester

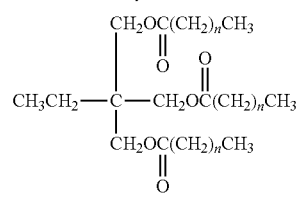

1,1,1-Trimethylolpropane ester (TMPE)

Examples of suitable polyol esters that include a silicone functional group (also called silicone multi-esters) and that are suitable for use as the polyol ester disclosed herein are sold by Siltech Corporation in association with the trade name Silube® TMP D2 (branched silicones with C8/C10 fatty groups), Silube® TMP D219 (branched silicones with C18 fatty groups), and Silube® TMP D218 (branched silicones with branched C18 fatty groups). These compounds are based on trimethylolpropane.

An example of a polyol ester made by reacting a fatty acid modified silicone (FAS) with trimethylolpropane (TMP) is shown below:

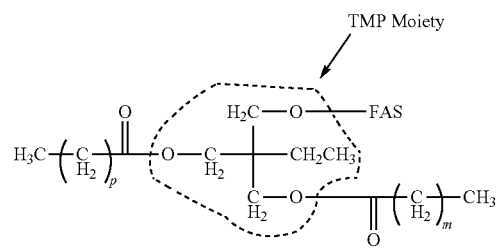

Examples of fatty acid modified silicones that can be the fatty acid modified silicone in the above formula (FAS) include the following:

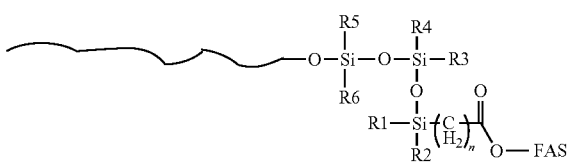

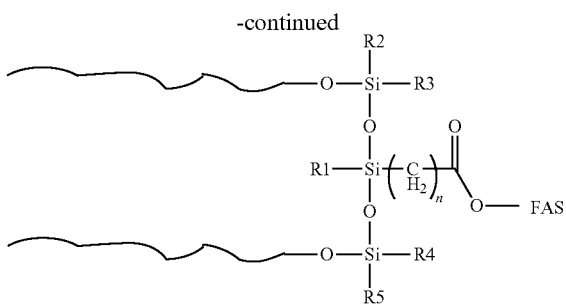

wherein R1, R2, R3, R4, R5 and R6 can each be selected from a hydrogen moiety, a methyl (CH$_3$) group and a higher alkyl group, and wherein R1, R2, R3, R4, R5 and R6 can be the same or different.

For example, the polyol ester can be deposited on the surfaces of the pigment particles in an amount in the range of from about 0.2% to about 2.0% by weight, based on the total weight of the pigment particles. For example, the polyol ester can be deposited on the surfaces of the pigment particles in an amount in the range of from about 0.4% to about 1.0% by weight, based on the total weight of the pigment particles. For example, the polyol ester can be deposited on the surfaces of the pigment particles in an amount in the range of from about 0.5% to about 0.8% by weight, based on the total weight of the pigment particles. The exact amount of the polyol ester deposited on the surfaces of the pigment particles will typically vary depending on the application.

If desired, two or more polyol esters as described above can be deposited on the surfaces of the pigment particles.

The method of forming a treated, particulate inorganic pigment in accordance with this disclosure comprises providing a plurality of pigment particles, providing a polyol ester, and depositing the polyol ester on the surfaces of the pigment particles. The pigment particles used in the method are the pigment particles described above. The polyol ester used in the method is the polyol ester described above. For example, the pigment particles can be titanium dioxide particles. For example, the polyol ester can be formed by reacting at least one fatty acid with a polyhydric alcohol selected from the group consisting of ethylene glycol, glycerol, neopentyl glycol, trimethylolpropane, pentaerythritol, mannitol, sorbitol and mixtures thereof. For example, the polyhydric alcohol can be trimethylolpropane.

For example, at the time the polyol ester is deposited on the surfaces of the pigment particles, the pigment particles can have a primary particle size in the range of from about 0.05 microns to about 1.0 microns, typically in the range of from about 0.2 microns to about 0.6 microns. If desired, two or more polyol esters as described above can be deposited on the surfaces of the pigment particles.

The polyol ester can be deposited on the inorganic pigment, either directly on the surfaces of the pigment particles or on top of one or more components (for example, alumina and/or silica coatings) that have been deposited on the surfaces of the pigment particles, by any method known in the art. For example, the polyol ester can be deposited on the surfaces of the pigment particles by milling the polyol ester and pigment particles together in a fluid energy mill, by spraying the polyol ester on the surfaces of the pigment particles, by mixing the polyol ester with the pigment particles in dry form, or by mixing the polyol ester and pigment particles together (optionally with a dispersing agent) in an aqueous slurry. For example, the polyol ester can be deposited on the surfaces of the pigment particles by mixing the polyol ester with the pigment particles in an aqueous slurry and subsequently drying the slurry. For example, the aqueous slurry can be the same aqueous slurry that has been used to coat at least one inorganic coating on the surfaces of the pigment particles. For example, once the polyol ester is deposited on the surfaces of the pigment particles, the treated, particulate inorganic pigment can dried and milled (for example, steam milled).

For example, the polyol ester can be deposited on the surfaces of the pigment particles in an amount in the range of from about 0.2% to about 2.0% by weight, based on the total weight of the pigment particles. For example, the polyol ester can be deposited on the surfaces of the pigment particles in an amount in the range of from about 0.4% to about 1.0% by weight, based on the total weight of the pigment particles. For example, the polyol ester can be deposited on the surfaces of the pigment particles in an amount in the range of from about 0.5% to about 0.8% by weight, based on the total weight of the pigment particles. The exact amount of the polyol ester deposited on the surfaces of the pigment particles will typically vary depending on the application.

For example, in one embodiment of the method disclosed herein, an agglomerated raw titanium dioxide slurry is formed using sodium hexametaphosphate as a dispersant. The slurry is sand milled to reduce the particle size of the titanium dioxide to in the range of from about 0.1 microns to about 1.0 microns (for example, such that about 90% of the particles are less than 0.63 microns). Next, the milled slurry is heated to about 75° C., treated with concentrated acid, allowed to digest and subsequently treated with caustic to form hydroxyl sites on the surfaces of the pigment particles. The pigment is then washed to remove salts. The washed pigment is then treated with 0.2% to 2.0% by weight polyol esters, based on the total weight of the pigment. The polyol ester treated pigment is then dried and subsequently steam milled (micronized).

The polymer composition disclosed herein includes at least one polymer, and the treated, particulate inorganic pigment as described above.

Examples of polymers to which the treated, particulate inorganic pigment can be added to form the polymer composition include polyolefins such as polyethylene (for example, low density polyethylene) and polypropylene, acrylic resins such as poly(methyl methacrylate), polyester resins such as polyethylene terephthalate, polyamide resins, styrenic resins such as acrylonitrile-butadiene-styrene copolymer, polyvinyl chloride, polycarbonate resins, and mixtures thereof. For example, the polymer(s) can be selected from the group consisting of polyolefins, acrylic resins, polyester resins, polyamide resins, styrenic resins, polyvinyl chloride, polycarbonate resins, and mixtures thereof. For example, the polymer(s) can be selected from the group consisting of polyethylene, polypropylene, poly(methyl methacrylate), polyethylene terephthalate, polyamide resins, acrylonitrile-butadiene-styrene copolymer, polyvinyl chloride, polycarbonate resins, and mixtures thereof.

The treated, particulate inorganic pigment can be admixed with the polymer to form the polymer composition by any method known in the art. For example, the treated, particulate inorganic pigment can be added to a slurry containing the polymer and mixed therein.

The amount of the treated, particulate inorganic pigment included in the polymer composition can vary depending on the type of polymer composition. For example, the treated, particulate inorganic pigment can be included in the polymer composition in an amount in the range of from about 30% to about 80% by weight based on the total weight of the polymer composition. For example, the treated, particulate inorganic pigment can be included in the polymer composition in an amount in the range of from about 45% to about 65% by weight based on the total weight of the polymer composition.

For example, a treated, particulate titanium dioxide pigment can be mixed with the subject polymer together with a dispersant to prepare a 75% by weight titanium dioxide-containing polymeric master batch concentrate. The mixing process can be carried out, for example, via mastication of the mixture in the mixing bowl of a Plasticorder™ Model PL-2000 as sold by C.W. Brabender Instruments, Inc., at 100° C. and a mixing speed of 100 rpm.

The treatment of an inorganic pigment with a polyol ester as disclosed herein significantly improves the bulk density of the pigment which improves the flow properties, processability and dispersibility of the pigment, particularly in polymer compositions. The polyol esters used herein are very stable and have low volatility and good biodegradable and eco-toxicity properties.

The hydrophobic nature of the treated pigment makes it very suitable for use in polymer compositions. For example, the polymer composition disclosed herein has a reduced grit content. Due to the polyol ester, the treated, particulate inorganic pigment can be dispersed in base compositions including polymer compositions using less time and energy than the particulate inorganic pigments used heretofore.

The following examples illustrate specific embodiments consistent with the present disclosure but do not limit the scope of the disclosure or the appended claims. Concentrations and percentages are by weight unless otherwise indicated.

Example 1

Particulate titanium dioxide pigment formed by the chloride process and containing 0.8% alumina in its crystalline lattice was dispersed in water in the presence of 0.1% by weight, based on the weight of the pigment, sodium hexametaphosphate (a dispersant) and an amount of sodium hydroxide sufficient to adjust the pH of the aqueous solution to a minimum value of 9.5. An amount of titanium dioxide sufficient to form an aqueous slurry having a solids content of 35% by weight was utilized. The titanium dioxide slurry was then subjected to sand milling (using a zircon sand-to-pigment weight ratio of 4:1) until 90% of the pigment particles were smaller than 0.63 microns, as determined utilizing a Microtrac™ X100 Particle Size Analyzer.

The slurry was then heated to 75° C., acidified to a pH of 2.0 using concentrated sulfuric acid, and allowed to digest at 75° C. for 30 minutes. Next, the pH of the slurry was adjusted to 6.5 using a 20% by weight aqueous sodium hydroxide solution, and the slurry was further digested for 30 minutes at 75° C. The pH of the slurry was finally readjusted to 6.5, as necessary, and the dispersion was filtered while hot. The resulting filtrate was washed with water, which had been preheated to 60° C., in an amount equal to the weight of recovered pigment.

Next, a polyol ester, specifically a trimethylolpropane ester having 12 carbon atoms ("TMP-C12") was added to the washed filter cake in an amount of 0.6% by weight based on the weight of the titanium dioxide. The resulting pigment was oven dried at 110° C. overnight and the dried pigment was crushed to yield dry pigment powder.

The dried pigment was then steam micronized, utilizing a steam to pigment weight ratio of 1:4, with a steam injector pressure set at 146 psi and micronizer ring pressure set at 118 psi. The resulting treated pigment sample was evaluated in titanium dioxide/polyethylene concentrates, according to the following procedure.

First, 109.5 grams of the pigment were mixed with 36.5 grams of low density polyethylene as manufactured by the Dow Chemical Co. (Dow™ 4012) and 0.05% by weight, based on the weight of the polyethylene, of an 80/20 mixture of tris(2,4-di-tertbutylphenyl) phosphite and octadecyl-3-(3, 5-di-tertbutyl-4-hydroxyphenyl)propionate, to prepare a 75% by weight titanium dioxide-containing polyethylene concentrate, via mastication of the mixture in the mixing bowl of a Plasticorder™ Model PL-2000 as sold by C.W. Brabender Instruments, Inc., at 100° C. and a mixing speed of 100 rpm.

Instantaneous torque and temperature values were then recorded for a nine minute period to ensure equilibrium mixing conditions were attained. Equilibrium torque values were determined via averaging the measured instantaneous torque values for a two minute period after equilibrium mixing conditions had been achieved.

The resulting polymer concentrate was cooled and ground into pellets. The melt flow index value was determined on the resulting pellet concentrate using ASTM method D1238, procedure B. Maximum extruder processing pressure was determined by extruding 100 grams of the 70% concentrate through a 500 mesh screen filter using a 0.75 inch barrel, 25/1 length to diameter extruder attached to the aforementioned Brabender™ Plasticorder, at an average processing temperature of approximately 190° C. and at 75 rpm, while recording instrument pressure values at the extruder die.

The amount of inorganic residue left on the 500 mesh screen filter, reported as pigment grit content in parts-per-million based on pigment, was determined gravimetrically via heating the post-extrusion screen in a muffle furnace at 700° C. for twenty minutes, cooling the screen to room temperature, then subsequently weighing the screen, with comparison to its weight prior to use.

Blown film tests were carried out to determine how well the titanium dioxide had dispersed in the low density polyethylene (Dow™ 640) formulation. The pigment was first processed into a master batch with a titanium dioxide loading of 75 as described above. The master batch was then let down to 5.5% in low density polyethylene and blown into film using a Killion™ blown film extruder. The extruder had three zones, wherein zone one was maintained at 160° C., zone two was maintained at 171° C. and zone three was maintained at 177° C., and two dies wherein die one was maintained at 182° C. and die two was maintained at 193° C. at 100 rpm with a film tower speed of 17.1. A three foot sample was collected and separated into three 1 foot by 1 foot films. The nibs on the films were counted and reported in nibs per square foot.

The same procedure was repeated using titanium dioxide produced according to the procedure set forth above, but instead of using TMP-C12, trimethylol propane without a fatty acid ester ("TMP") was used to form Comparative Example 1a, polymethylhydrosiloxane ("PHMS") was used to form Comparative Example 1b, and 2-ethyl hexyl laurate ("2-EHL") was used to form Comparative Example 1c. The results of the tests are provided in Tables 1a and 1b below.

TABLE 1a

Comparison of Powder Characteristics of Titanium Dioxide Pigment

| Pigment Sample: | Bulk density (kg/L) | Pour density (kg/L) | Aerated density (kg/L) |
|---|---|---|---|
| Example 1 | 1.1 | 0.66 | 0.63 |
| Comparative Example 1a | 1.1 | 0.58 | 0.54 |
| Comparative Example 1b | 0.88 | 0.32 | 0.40 |
| Comparative Example 1c | 1.1 | 0.63 | 0.61 |

TABLE 1b

Processing Behavior of Titanium Dioxide-Containing Polyethylene Concentrates

| Pigment Sample: | Melt Flow Index (g/10 minutes @190° C.) | Equilibrium Torque (meter-grams) | Max. Extruder Pressure (psi) | Pigment Grit Content (ppm) | Nibs per sq. ft. in blow film |
|---|---|---|---|---|---|
| Example 1 | 6 | 1041 | 534 | 57 | 1 |
| Comparative Example 1a | 0 | 1219 | 1803 | 328 | 24 |
| Comparative Example 1b | 0 | 1209 | 754 | 104 | 22 |
| Comparative Example 1c | 0 | 1262 | 1052 | 134 | 24 |

As shown by the results, the titanium dioxide/polyethylene polymer concentrate incorporating titanium dioxide treated with a polyol ester (TMP-C12 triester) exhibited improved properties compared to the comparative samples, as indicated by a higher melt flow index, lower equilibrium torque value, lower maximum extruder pressure, lower grit content and lower nibs in the blown film.

Example 2

A titanium dioxide filter cake was prepared in the manner described in Example 1. Next, a trimethylolpropane ester having 18 carbon atoms ("TMP-C18") was added to the washed filter cake in an amount of 0.6% by weight, based on the weight of the titanium dioxide in the filter cake. The resulting pigment was oven dried at 110° C. overnight and the dried pigment was crushed to yield dry pigment powder.

The dried pigment was steam micronized, utilizing a steam to pigment weight ratio of 1:4, with a steam injector pressure set at 146 psi and micronizer ring pressure set at 118 psi.

Next, the same overall procedure was repeated using titanium dioxide produced according to the procedure outlined above but instead of using TMP-C18, polymethylhydrosiloxane (PHMS) was used to form Comparative Example 2a.

The resulting treated pigment samples were evaluated in titanium dioxide/polyethylene concentrates, according to the same procedure described above in Example 1. The results of the tests are shown below.

TABLE 2a

Comparison of Powder Characteristics of Titanium Dioxide Pigment

| Pigment Sample: | Bulk density (kg/L) | Pour density (kg/L) | Aerated density (kg/L) |
|---|---|---|---|
| Example 2 | 1.1 | 0.54 | 0.56 |
| Comparative Example 2a | 0.88 | 0.32 | 0.40 |

TABLE 2b

Processing Behavior of Titanium Dioxide Containing Polyethylene Concentrates

| Pigment Sample: | Melt Flow Index (g/10 minutes: 190° C.) | Equilibrium Torque (meter-grams) | Max. Extruder Pressure (psi) | Pigment Grit Content (ppm) | Nibs per sq. ft. in blow film |
|---|---|---|---|---|---|
| Example 2 | 0 | 1041 | 567 | 138 | 3 |
| Comparative Example 2a | 0 | 1209 | 754 | 104 | 22 |

The results show improved results can be obtained by the polyol ester treated pigment at various polyol ester chain lengths. The described titanium dioxide/polyethylene polymer composition, comprising a pigment having an organic surface treatment coating comprising TMP-C18 also exhibited improved properties versus the comparative sample, as indicated by a higher bulk density, lower equilibrium torque value, lower maximum extruder pressure and lower nibs in the blown film.

Example 3

A titanium dioxide filter cake was prepared in the same manner described in Example 1 above. Next, pentaerythritol tetra stearate ("PETS ester") was added to the washed filter cake in an amount of 0.6% by weight, based on the weight of the titanium dioxide in the filter cake. The resulting pigment was oven dried at 110° C. overnight and the dried pigment was crushed to yield dry pigment powder.

The dried pigment was steam micronized, utilizing a steam to pigment weight ratio of 1:4, with a steam injector pressure set at 146 psi and micronizer ring pressure set at 118 psi. The resulting treated pigment sample was evaluated in titanium dioxide/polyethylene concentrates, according to the procedure described in Example 1 above. The same procedure was then repeated using titanium dioxide produced according to the procedure described in Example 1 above but instead of using PETS ester, polymethylhydrosiloxane (PHMS) was used to form Comparative Example 3a. The results are shown by Tables 3a and 3b below.

TABLE 3a

Comparison of the Bulk Density of TiO$_2$ Samples

| Pigment Sample: | Bulk density (kg/L) | Pour density (kg/L) | Aerated density (kg/L) |
| --- | --- | --- | --- |
| Example 3 | 1.1 | 0.6 | 0.59 |
| Comparative Example 3a | 0.88 | 0.32 | 0.40 |

TABLE 3b

Processing Behavior of Titanium Dioxide Containing Polyethylene Concentrates

| Pigment Sample: | Melt Flow Index (g/10 minutes: 90° C.) | Equilibrium Torque (meter-grams) | Max. Extruder Pressure (psi) | Pigment Grit Content (ppm) | Nibs per sq. ft. in blow film |
| --- | --- | --- | --- | --- | --- |
| Example 3 | 0 | 1124 | 2177 | 345 | 33 |
| Comparative Example 3a | 3 | 1234 | 658 | 80 | 49 |

The titanium dioxide/polyethylene polymer concentrate, comprising a pigment having an organic surface treatment coating comprising PETS ester also showed improvements versus the comparative sample by indicating a higher bulk density, a lower equilibrium torque value and lower nibs in the blown film.

Example 4

A titanium dioxide filter cake was prepared in the manner described in Example 1. Next, a polyol ester including a silicone functional group ("Silube® D2," sold by Siltech Corporation) was added to the washed filter cake in an amount of 0.6% by weight, based on the weight of the titanium dioxide in the filter cake. The resulting pigment was oven dried at 110° C. overnight and the dried pigment was crushed to yield dry pigment powder. The dried pigment was then steam micronized, utilizing a steam to pigment weight ratio of 1:4, with a steam injector pressure set at 146 psi and micronizer ring pressure set at 118 psi.

Next, the same overall procedure was then repeated using titanium dioxide produced according to the procedure described in Example 1 above but instead of using "Silube® D2," polymethylhydrosiloxane (PHMS) was used to form Comparative Example 4a.

The resulting treated pigment samples were evaluated in titanium dioxide/polyethylene concentrates, according to the same procedure described above in Example 1. The results are shown by Tables 4a and 4b below.

TABLE 4a

Comparison of the Bulk Density of TiO$_2$ Samples

| Pigment Sample: | Bulk density (kg/L) | Pour density (kg/L) | Aerated density (kg/L) |
| --- | --- | --- | --- |
| Example 4 | 1.2 | 0.7 | 0.69 |
| Comparative example 4a | 0.88 | 0.32 | 0.40 |

TABLE 4b

Processing Behavior of Titanium Dioxide Containing Polyethylene Concentrates

| Pigment Sample: | Melt Flow Index (g/10 minutes: 190° C.) | Equilibrium Torque (meter-grams) | Max. Extruder Pressure (psi) | Pigment Grit Content (ppm) | Nibs per sq. ft. in blow film |
| --- | --- | --- | --- | --- | --- |
| Example 4 | 3 | 1235 | 564 | 61 | 2 |
| Comparative Example 4a | 3 | 1234 | 658 | 80 | 49 |

The results show that improved results can also be obtained by using a pigment treated with a polyol ester having a silicone functional group (for example, formed with a fatty acid modified silicone). The titanium dioxide/polyethylene polymer concentrate, comprising a pigment having an organic surface treatment coating comprising a polyol ester having a branched silicone with C8/C10 fatty groups ("Silube® D2"), also showed improvements versus the comparative sample by indicating a higher bulk density, a lower maximum extruder pressure, a lower grit content and lower nibs in the blown film.

Therefore, the pigments, compositions and methods are well adapted to attain the ends and advantages mentioned, as well as those that are inherent therein. The particular examples disclosed above are illustrative only, as the present pigments, compositions and methods may be modified and practiced in different but equivalent manners apparent to those skilled in the art having the benefit of the teachings herein. It is therefore evident that the particular illustrative examples disclosed above may be altered or modified, and all such variations are considered within the scope and spirit of the present pigments, compositions and methods. While the pigments, compositions and methods are described in terms of "comprising," "containing," "having," or "including" various components or steps, the pigments, compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A treated, particulate inorganic pigment, comprising:
   a plurality of pigment particles; and
   a trimethylolpropane polyester deposited on the surfaces of said pigment particles, wherein said trimethylolpropane polyester is formed by reacting at least one fatty acid with trimethylolpropane, said fatty acid(s) being selected from saturated, straight chain fatty acids and saturated, branched chain fatty acids and functioning to fully esterify said trimethylolpropane to form said trimethylolpropane polyester.

2. The treated, particulate inorganic pigment of claim 1, wherein said pigment particles are formed of a pigment selected from the group consisting of titanium dioxide, basic carbonate white lead, basic sulfate white lead, basic silicate white lead, zinc sulfide, composite pigments of zinc sulfide and barium sulfate, zinc oxide, antimony oxide, iron oxide, lead oxide, aluminum oxide, silicon dioxide, chromium oxide, zirconium oxide, calcium carbonate, calcium sulfate, china clay, kaolin clay, mica, diatomaceous earth, cadmium sulfide, cadmium selenide, lead chromate, zinc chromate, nickel titanate, and mixtures thereof.

3. The treated, particulate inorganic pigment of claim 2, wherein said pigment particles are formed of titanium dioxide.

4. The treated, particulate inorganic pigment of claim 1, further comprising at least one inorganic coating selected from the group consisting of metal oxide coatings, metal hydroxide coatings, and mixtures thereof, said coating being deposited on the surfaces of said pigment particles.

5. The treated, particulate inorganic pigment of claim 1, wherein said fatty acid has from 6 to 24 carbon atoms.

6. The treated, particulate inorganic pigment of claim 1, wherein said fatty acid is selected from the group consisting of trimethyl hexanoic acid, octanoic acid, decanoic acid, dodecanoic acid, myristic acid, stearic acid, caprylic acid, capric acid, lauric acid, palmitic acid, arachic acid, behenic acid, adipic acid, sebacic acid, azelaic acid, and mixtures thereof.

7. The treated, particulate inorganic pigment of claim 6, wherein said fatty acid is selected from the group consisting of caprylic acid, capric acid, lauric acid, and mixtures thereof.

8. The treated, particulate inorganic pigment of claim 1, wherein said fatty acid is a fatty acid that has been reacted with a silicone compound to form a fatty acid modified silicone.

9. The treated, particulate inorganic pigment of claim 1, wherein said fatty acid is hydroxy-free.

10. The treated, particulate inorganic pigment of claim 1, wherein said trimethylolpropane polyester is formed by reacting at least one hydroxy-free fatty acid with trimethylolpropane, said hydroxy-free fatty acid being selected from the group of trimethyl hexanoic acid, octanoic acid, decanoic acid, dodecanoic acid, myristic acid, stearic acid, caprylic acid, capric acid, lauric acid, palmitic acid, arachic acid, behenic acid, adipic acid, sebacic acid, azelaic acid, a hydroxy-free fatty acid modified silicone, and mixtures thereof.

11. The treated, particulate inorganic pigment of claim 1, wherein said trimethylolpropane polyester is selected from the group consisting of trimethylolpropane trilaurate, trimethylolpropane tricocoate, trimethylolpropane tristearate, and mixtures thereof.

12. The treated, particulate inorganic pigment of claim 1, wherein said trimethylolpropane polyester is deposited on the surfaces of said pigment particles in an amount in the range of from about 0.2% to about 2.0% by weight, based on the total weight of said pigment particles.

13. The treated, particulate inorganic pigment of claim 1, wherein said polyol ester is a trimethylolpropane ester.

14. The treated, particulate inorganic pigment of claim 1, wherein said polyol ester is a pentaerythritol ester.

15. A treated, particulate inorganic pigment, comprising:
    a plurality of titanium dioxide pigment particles; and
    a trimethylolpropane polyester deposited on the surfaces of said pigment particles, said trimethylolpropane polyester being formed by reacting at least one hydroxy-free fatty acid with trimethylolpropane, wherein said hydroxy-free fatty acid(s) has from 6 to 24 carbon atoms, is selected from saturated, straight chain fatty acids and saturated, branched chain fatty acids and functions to fully esterify said trimethylolpropane to form said trimethylolpropane polyester.

16. The treated, particulate inorganic pigment of claim 15, wherein said hydroxy-free fatty acid is selected from the group consisting of trimethyl hexanoic acid, octanoic acid, decanoic acid, dodecanoic acid, myristic acid, caprylic acid, capric acid, lauric acid, myristic acid, palmitic acid, arachic acid, behenic acid, adipic acid, sebacic acid and azelaic acid and mixtures thereof.

17. The treated, particulate inorganic pigment of claim 15, wherein said hydroxy-free fatty acid is a hydroxy-free fatty acid that has been reacted with a silicone compound to form a fatty acid modified silicone.

18. A method of forming a treated, particulate inorganic pigment, comprising:
    providing a plurality of pigment particles;
    providing a trimethylolpropane polyester, wherein said trimethylolpropane polyester is formed by reacting at least one hydroxy-free fatty acid with trimethylolpropane, said hydroxy-free fatty acid(s) being selected from saturated, straight chain fatty acids and saturated, branched chain fatty acids and functioning to fully esterify the trimethylolpropane to form said trimethylolpropane polyester; and depositing said trimethylolpropane polyester on the surfaces of said pigment particles.

19. The method of claim 18, wherein said pigment particles are titanium dioxide particles.

20. The method of claim 18, wherein said fatty acid(s) is selected from the group consisting of trimethyl hexanoic acid, octanoic acid, decanoic acid, dodecanoic acid, myristic acid, caprylic acid, capric acid, lauric acid, myristic acid, palmitic acid, arachic acid, behenic acid, adipic acid, sebacic acid, azelaic acid and a fatty acid that has been reacted with a silicone compound to form a fatty acid modified silicone, and mixtures thereof.

21. The method of claim 18, wherein said trimethylolpropane polyester is deposited on the surfaces of said pigment particles by mixing said trimethylolpropane polyester with said pigment particles in an aqueous slurry and drying said slurry.

22. A polymer composition, comprising:
   at least one polymer; and
   a treated, particulate inorganic pigment, said pigment including:
      a plurality of pigment particles; and
      a polyol ester deposited on the surfaces of said pigment particles, wherein said polyol ester is formed by reacting at least one hydroxy-free fatty acid with a polyhydric alcohol having at least 6 carbon atoms, said hydroxy-free fatty acid(s) being selected from saturated, straight chain fatty acids and saturated, branched chain fatty acids and functioning to fully esterify the polyhydric alcohol to form said polyol ester.

23. The polymer composition of claim 22, wherein said polymer is selected from the group consisting of polyolefins, acrylic resins, polyester resins, polyamide resins, styrenic resins, polyvinyl chloride, polycarbonate resins, and mixtures thereof.

24. The polymer composition of claim 23, wherein said polymer is selected from the group consisting of polyethylene, polypropylene, poly(methyl methacrylate), polyethylene terephthalate, polyamide resins, acrylonitrile-butadiene-styrene copolymer, polyvinyl chloride, polycarbonate resins, and mixtures thereof.

25. The polymer composition of claim 22, wherein said treated, particulate inorganic pigment is present in said polymer composition in an amount in the range of from about 30% to about 80% by weight based on the total weight of the polymer composition.

26. The polymer composition of claim 22, wherein said polyol ester is formed by reacting at least one hydroxy-free fatty acid with a polyhydric alcohol selected from the group consisting of trimethylolpropane, pentaerythritol, mannitol, sorbitol, and mixtures thereof.

27. The polymer composition of claim 26, wherein said polyhydric alcohol is trimethylolpropane.

* * * * *